United States Patent
Itaya (10) Patent No.: US 10,847,974 B2
(45) Date of Patent: Nov. 24, 2020

(54) DEVICE AND METHOD FOR ESTIMATING A VOLTAGE DISTRIBUTION ALONG A POWER DISTRIBUTION LINE IN A HIGH-VOLTAGE SYSTEM

(71) Applicant: Mitsubishi Electric Corporation, Tokyo (JP)

(72) Inventor: Nobuhiko Itaya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 24 days.

(21) Appl. No.: 16/098,002

(22) PCT Filed: May 24, 2016

(86) PCT No.: PCT/JP2016/065347
§ 371 (c)(1),
(2) Date: Oct. 31, 2018

(87) PCT Pub. No.: WO2017/203611
PCT Pub. Date: Nov. 30, 2017

(65) Prior Publication Data
US 2019/0148940 A1     May 16, 2019

(51) Int. Cl.
*H02J 3/12* (2006.01)
*H02J 3/00* (2006.01)
(Continued)

(52) U.S. Cl.
CPC .............. *H02J 3/12* (2013.01); *G05B 15/02* (2013.01); *G06Q 50/06* (2013.01); *H02J 3/00* (2013.01);
(Continued)

(58) Field of Classification Search
CPC .......... H02J 3/12; H02J 3/00; H02J 2003/003; H02J 13/0079; H02J 3/18; H02J 2003/146;
(Continued)

(56) References Cited

U.S. PATENT DOCUMENTS

| | | | |
|---|---|---|---|
| 2013/0054037 A1* | 2/2013 | Ikawa | G05F 1/67 700/286 |
| 2014/0200729 A1 | 7/2014 | Yamane et al. | |

(Continued)

FOREIGN PATENT DOCUMENTS

| | | |
|---|---|---|
| JP | 2000245064 A | 9/2000 |
| JP | 2013074639 A | 4/2013 |

(Continued)

OTHER PUBLICATIONS

International Search Report (PCT/ISA/210) dated Aug. 9, 2016, by the Japan Patent Office as the International Searching Authority for International Application No. PCT/JP2016/065347.

(Continued)

*Primary Examiner* — Robert E Fennema
*Assistant Examiner* — Marzia T Monty
(74) *Attorney, Agent, or Firm* — Buchanan Ingersoll & Rooney PC (57) ABSTRACT

The power distribution system management device according to the present invention includes a communication unit that receives measurement values from a plurality of high-voltage sensors that each measure a voltage and a power flow of a power distribution line in a high-voltage system, and receives, from a plurality of smart meters that each measure an amount of power, information on the amount of power; and a voltage control unit that sections the power distribution line between two high-voltage sensors among the plurality of high-voltage sensors into a plurality of (Continued)

sections to estimate a voltage distribution along the power distribution line based on two of the measurement values received from the two high-voltage sensors and on the amount of power of each of the sections.

15 Claims, 6 Drawing Sheets

(51) Int. Cl.
    *G05B 15/02*     (2006.01)
    *G06Q 50/06*     (2012.01)

(52) U.S. Cl.
    CPC ............... *H02J 3/003* (2020.01); *Y02B 10/14* (2013.01); *Y02E 10/563* (2013.01)

(58) Field of Classification Search
    CPC ......... H02J 3/383; G06Q 50/06; Y02B 10/14; Y02E 10/563

See application file for complete search history.

(56) References Cited

U.S. PATENT DOCUMENTS

| | | | |
|---|---|---|---|
| 2014/0371929 A1* | 12/2014 | Allen | ................. G01R 19/2513 700/286 |
| 2016/0204614 A1* | 7/2016 | Itaya | ......................... H02J 3/14 307/82 |
| 2017/0244279 A1 | 8/2017 | Itaya | |

FOREIGN PATENT DOCUMENTS

| | | | | |
|---|---|---|---|---|
| JP | 2015109728 A | 6/2015 | | |
| JP | 5774254 B1 | 7/2015 | | |
| JP | 2016039652 A | 3/2016 | | |
| WO | WO-2014207849 A1 * | 12/2014 | | |
| WO | WO-2016032130 A1 * | 3/2016 | ................ H02J 3/00 | |

OTHER PUBLICATIONS

Notification of Reasons for Refusal dated Dec. 26, 2016, by the Japan Patent Office for Application No. 2016-568461.
Written Opinion (PCT/ISA/237) dated Aug. 9, 2016, by the Japan Patent Office as the International Searching Authority for International Application No. PCT/JP2016/065347.

* cited by examiner

| NUMBER | CONTRACT DEMAND | CONTRACT TYPE | BUSINESS CATEGORY |
|---|---|---|---|
| 1 | $A_1$ | $B_1$ | $C_1$ |
| 2 | $A_2$ | $B_2$ | $C_2$ |
| 3 | ⋮ | ⋮ | ⋮ |
| ⋮ | | | |

FIG.9

| SM NUMBER | LATITUDE/ LONGITUDE | PV PANEL CAPACITY | TYPE | ... |
|---|---|---|---|---|
| S1 | $X_1, Y_1$ | $P_{S1}$ | WHOLE POWER PURCHASE | |
| S2 | $X_2, Y_2$ | $P_{S2}$ | SURPLUS POWER PURCHASE | |
| S3 | $X_3, Y_3$ | $P_{S3}$ | WHOLE POWER PURCHASE | |
| ⋮ | ⋮ | ⋮ | ⋮ | |

DEVICE AND METHOD FOR ESTIMATING A VOLTAGE DISTRIBUTION ALONG A POWER DISTRIBUTION LINE IN A HIGH-VOLTAGE SYSTEM

FIELD

The present invention relates to a device that estimates a state of a power distribution system (hereinafter referred to as "power distribution system state estimation device") and to a method of estimating a state of a power distribution system (hereinafter referred to as "power distribution system state estimation method") each for estimating a state of high-voltage power distribution system.

BACKGROUND

A power distribution system generally includes a high-voltage system and a low-voltage system, and the power receiving terminal at a general customer is connected to this low-voltage system. An electric utility company is required to maintain the voltage at the power receiving terminal at a general customer within a suitable voltage range. As an example, in a case of power reception at 100 V, the voltage is required to be maintained in a range from 95 V to 107 V. Therefore, an electric utility company adjusts the control level of the voltage controller connected to the high-voltage system to maintain the voltage at the power receiving terminal of a general customer. Note that the term "power distribution system" hereinafter refers to a high-voltage system unless otherwise specified.

To control the voltage controller connected to the power distribution system, and for installation planning of the power distribution system, it is important to estimate the state of the power distribution system, i.e., voltages at points on a power distribution line of the power distribution system and the like. In these days, a power distribution system is connected with various solar power generation systems of various scales, including a household solar power generation facility and a mega solar system, and thus a variation in the amount of power generation generated by the solar power generation system, in turn, changes the state of the power distribution system accordingly.

Patent Literature 1 discloses a technology for calculating the state, i.e., the voltage distribution, of a power distribution system for making a deployment plan of sensor-incorporated switchgear units.

CITATION LIST

Patent Literature

Patent Literature 1: Japanese Patent Application Laid-open No. 2015-109728

SUMMARY

Technical Problem

However, the technology described in Patent Literature 1 described above uses preset power system data and power state data to calculate a voltage distribution. This presents a problem in that the actual voltage distribution and an estimated voltage distribution may significantly differ from each other, that is, a large estimation error may occur in terms of the state of the power distribution system.

The present invention has been made in view of the foregoing, and it is an object of the present invention to provide a power distribution system state estimation device capable of estimating the state of a power distribution system with high accuracy.

Solution to Problem

A power distribution system state estimation device according to an aspect of the present invention includes a communication unit that receives measurement values from a plurality of high-voltage sensors that each measure a voltage and a power flow of a power distribution line in a high-voltage system, and receives, from a plurality of smart meters that each measure an amount of power, information on the amount of power. The power distribution system state estimation device according to the present invention also includes a state estimation unit sections the power distribution line between two high-voltage sensors among the plurality of high-voltage sensors into a plurality of sections and estimates a voltage distribution along the power distribution line based on two of the measurement values received from the two high-voltage sensors and on the amount of power of each of the sections.

Advantageous Effects of Invention

This invention provides an advantage in that the amount of solar power generation can be estimated with high accuracy without increase in the number of measurement devices and in the number of communication devices.

DESCRIPTION OF EMBODIMENTS

An embodiment of the power distribution system state estimation device and of the power distribution system state estimation method according to the present invention will be described in detail below with reference to the drawings. Note that this embodiment is not intended to limit the scope of this invention.

First Embodiment

Figure 1:
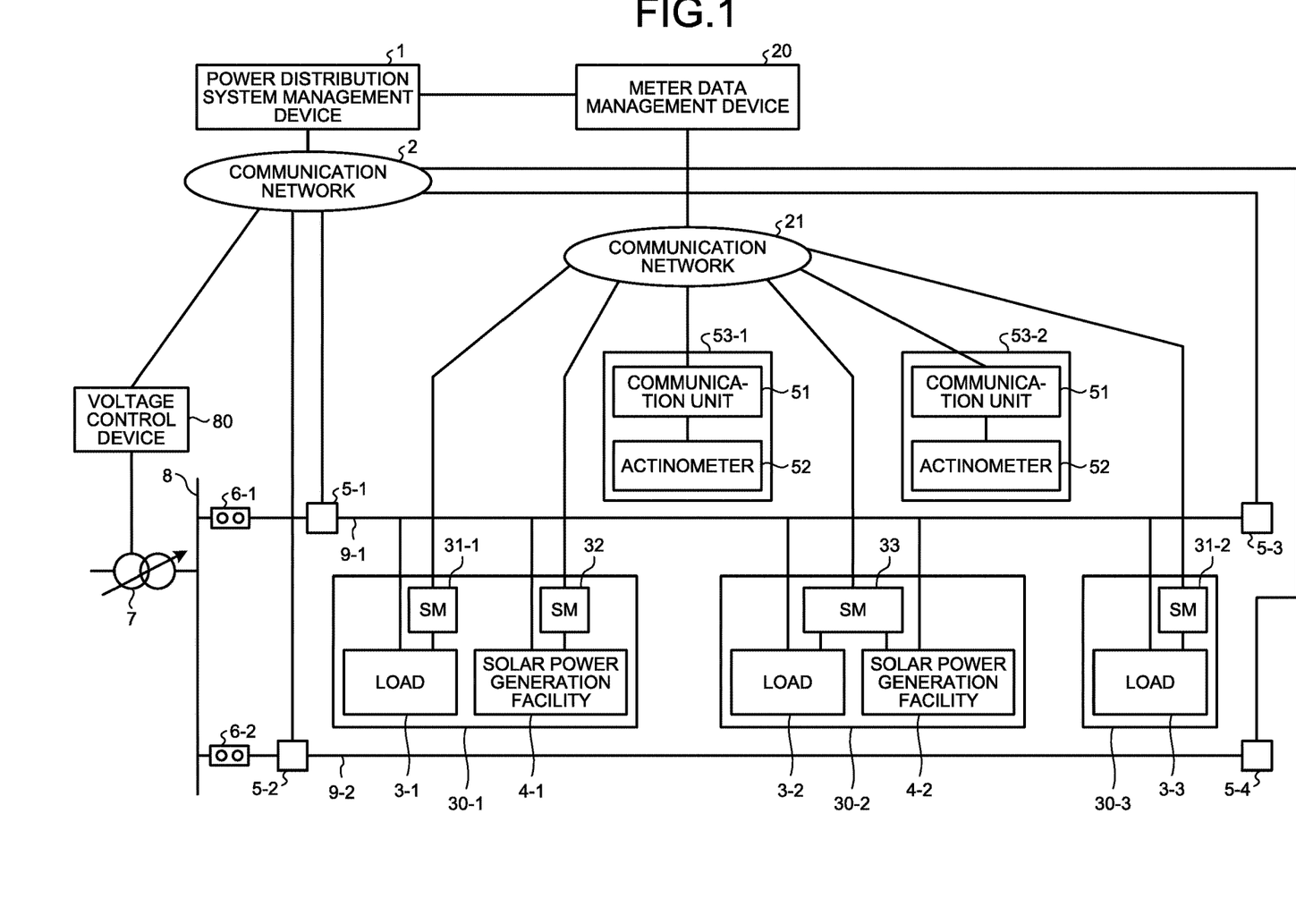
FIG. 1 is a diagram illustrating an example of power distribution system of one embodiment.

FIG. 1 is a diagram illustrating an example of power distribution system of a first embodiment according to the present invention. FIG. 1 illustrates a voltage controller 7, which is, for example, a load ratio control transformer (LRT) that serves as a power distribution transformer, installed in a substation. A busbar 8 is connected to the secondary side of the voltage controller 7. Two power distribution lines 9-1 and 9-2 are connected in parallel to the busbar 8. The power distribution lines 9-1 and 9-2 are each a power distribution line in a high-voltage system. Although FIG. 1 illustrates an example in which two power distribution lines are connected to the busbar 8, the number of power distribution lines connected to the busbar 8 is not limited to two.

The power distribution line 9-1 has one end connected to the busbar 8 via a circuit breaker 6-1. The power distribution line 9-1 has an upstream end point, at which a high-voltage sensor 5-1 is installed, which is a measurement device for measuring the voltage and the power flow at the feed end of the power distribution line 9-1. The power distribution line 9-1 has a terminal end, to which a high-voltage sensor 5-3 is connected, which is a measurement device for measuring the voltage and the power flow at the terminal end of the power distribution line 9-1. The power distribution line 9-2 has one end connected to the busbar 8 via a circuit breaker 6-2. The power distribution line 9-2 has an upstream end point, at which a high-voltage sensor 5-2 is installed, which is a measurement device for measuring the voltage and the power flow at the feed end of the power distribution line 9-2. The power distribution line 9-2 has a terminal end, to which a high-voltage sensor 5-4 is connected, which is a measurement device for measuring the voltage and the power flow at the terminal end of the power distribution line 9-2. The circuit breaker 6-1 and the high-voltage sensor 5-1 may be formed as an integrated component. The circuit breaker 6-2 and the high-voltage sensor 5-2 may be formed as an integrated component.

The high-voltage sensors 5-1 to 5-4 each measure the voltage and the power flow, for example, at fixed intervals, and send the average of measurement results over a fixed time period, as measurement information. The measurement period of the high-voltage sensors 5-1 to 5-4 and the fixed time period for calculating the average may be any value, but it is assumed herein, for example, that the measurement period is one second, and the fixed time period for calculating the average is one minute. The high-voltage sensors 5-1 to 5-4 each have a communication function, and are connected to a communication network 2. The high-voltage sensors 5-1 to 5-4 periodically send measurement information to a power distribution system management device 1 across the communication network 2. Instead of periodically sending measurement information, the high-voltage sensors 5-1 to 5-4 may send measurement information in response to an instruction from the power distribution system management device 1 to send measurement information.

Also included are loads 3-1 to 3-3 and solar power generation facilities 4-1 and 4-2 that are connected to the power distribution line 9-1. The loads 3-1, 3-2, and 3-3 each represent the load of a customer. The load 3-1 is the load of a customer 30-1. The load 3-2 is the load of a customer 30-2. The load 3-3 is the load of a customer 30-3. Note that FIG. 1 illustrates part of the loads and the solar power generation facilities that are connected to the power distribution line 9-1, and loads and solar power generation facilities other than those illustrated in FIG. 1 are also connected to the power distribution line 9-1. In addition, for simplicity of illustration, FIG. 1 omits the loads and the solar power generation facilities connected to the power distribution line 9-2, and thus loads and solar power generation facilities are also connected to the power distribution line 9-2.

As illustrated in FIG. 1, the customer 30-1 has the solar power generation facility 4-1, and the customer 30-2 has the solar power generation facility 4-2. The customer 30-3 has no solar power generation facility. The customer 30-1 has entered into a whole power purchase agreement with an electric utility company to sell the entire amount of electricity generated by the solar power generation facility 4-1. That is, the solar power generation facility 4-1 is a power generation facility specified in the whole power purchase agreement. The customer 30-2 has entered into a surplus power purchase agreement with an electric utility company to sell surplus electricity that is the remainder after subtraction of the amount of power consumed by the load 3-2 from the amount of power generation generated by the solar power generation facility 4-2.

Also included are smart meters 31-1, 31-2, 32, and 33, which are each an electric power meter for automatic metering, and have a communication function. In the drawings, the term "smart meter" is indicated by an acronym of "SM." The solar power generation facility 4-1 of the customer 30-1 under a whole power purchase agreement is connected with the smart meter 32 that measures the amount of power generation of the solar power generation facility 4-1. The load 3-1 of the customer 30-1 is connected with the smart meter 31-1. The load 3-2 and the solar power generation facility 4-2 of the customer 30-2 under a surplus power purchase agreement are both connected with the smart meter 33. The load 3-3 of the customer 30-3 is connected with the smart meter 31-2. The smart meters 31-1 and 31-2 each measure the amount of downstream power, that is, power flowing in the direction from the electric utility company to the customer. The smart meter 32 measures the amount of upstream power, that is, power flowing in the direction from the customer to the electric utility company. The smart meter 33 measures the amount of power calculated by subtraction of the amount of downstream power from the amount of upstream power. As used herein, the smart meters 31-1 and 31-2 may be also referred to as "smart meter 31" when no differentiation is necessary.

The smart meters 31-1, 31-2, 32, and 33 are connected to a meter data management device 20 via a communication network 21. The smart meters 31-1, 31-2, 32, and 33 each measure the amount of power every certain measurement period, and send the measured amount of power to the meter data management device 20. That is, the communication network 21 is intended to be used for sending and receiving the measurement data measured by the smart meters. The present embodiment assumes that the smart meters 31-1, 31-2, 32, and 33 each have a measurement period, i.e., data collection period of 30 minutes. However, the measurement period of the smart meters 31-1, 31-2, 32, and 33 is not limited to 30 minutes. Although FIG. 1 illustrates the smart meters 31-1, 31-2, 32, and 33 as examples of smart meters, smart meters other than the smart meters 31-1, 31-2, 32, and 33 are connected to the power distribution lines 9-1 and 9-2 illustrated in FIG. 1.

A smart meter for measuring the amount of power generation generated by a solar power generation facility of a customer under a whole power purchase agreement is hereinafter referred to simply as "whole-power-purchase smart meter." The smart meter 32 of FIG. 1 is a whole-power-purchase smart meter.

The power distribution system management device 1 serving as a power distribution system state estimation device corrects the measurement value of a high-voltage sensor using the measurement value of a smart meter to estimate the state of each of the power distribution lines 9-1 and 9-2 of the power distribution system, i.e., a voltage distribution and/or the like along each of the power distribution lines 9-1 and 9-2 of the power distribution system. In addition, the power distribution system management device 1 controls the voltage controller connected to the power distribution lines 9-1 and 9-2, based on the results of estimation of the states of the power distribution lines 9-1 and 9-2 of the power distribution system. The power distribution system management device 1 may be installed in the business office or in the control office responsible for the power distribution system to be managed.

The voltage controller 7 is connected to a voltage control device 80 that controls the voltage controller 7. The power distribution system management device 1 sends, for example, information on the upper and lower limits of the voltage control range as a voltage control level, to the voltage control device 80 via the communication network 2. The voltage control device 80 controls the voltage controller 7 based on the information received from the power distribution system management device 1. Multiple voltage controllers that are not illustrated are also connected to the power distribution lines 9-1 and 9-2, and these voltage controllers are correspondingly controlled by voltage control devices. The power distribution system may be configured such that at least part of these voltage control devices perform control based on the voltage control level received from the power distribution system management device 1 via the communication network 2, similarly to the voltage control device 80. As described above, the present embodiment is described on the assumption of use of a centralized voltage control scheme in which the power distribution system management device 1 controls the voltage in the power distribution system. Although an example is described herein in which the power distribution system management device 1 also has a function as a centralized voltage control device that centrally controls the voltage in the power distribution system, a centralized voltage control device may be additionally installed separately from the power distribution system management device 1.

The communication network 21 is also connected with a measurement device 53-1 and a measurement device 53-2 that each measure the solar insolation amount. The measurement devices 53-1 and 53-2 are herein referred to as "measurement device 53" when no differentiation is necessary. Although FIG. 1 illustrates two measurement devices, it suffices that multiple measurement devices 53 be geographically distributed in practice. For example, approximately one measurement device 53 is installed per square kilometer. Each of the measurement devices 53 is desirably installed in a less shady place, and is thus installed, for example, on the north side of road, on the roof of building, on the roof of house, on a utility pole, or on a relay tower of a mobile communication system such as a cellular network. However, the place for installation of the measurement device 53 is not limited thereto. Although the present embodiment is described in terms of an example including the measurement device 53, the measurement device 53 may not be installed.

The description below will be provided using an example in which measurement values from the measurement devices 53 are sent together with measurement values of the smart meters 31 from the meter data management device 20 to the power distribution system management device 1. However, measurement values from the measurement devices 53 may be sent to the power distribution system management device 1 separately from measurement values of the smart meters 31. Measurement values from the measurement devices 53 may be sent to the power distribution system management device 1 via a network dedicated for the actinometers or via the communication network 2. Each of the measurement devices 53 may send a measurement value to the power distribution system management device 1 with a period shorter than 30 minutes, which is the data collection period of the smart meters 31, for example, in quasi-real time such as with a period of one minute.

Each of the measurement devices 53 includes a communication unit 51 that performs communication processing for providing connectivity with the communication network 21, and an actinometer 52 that measures the solar insolation amount. The communication unit 51 sends a measurement value, i.e., measurement data, measured by the actinometer 52 to the meter data management device 20 via the communication network 21. The communication unit 51 may be integrated with communication units, described later, in the smart meters 31-1, 31-2, 32, and 33.

Figure 2:
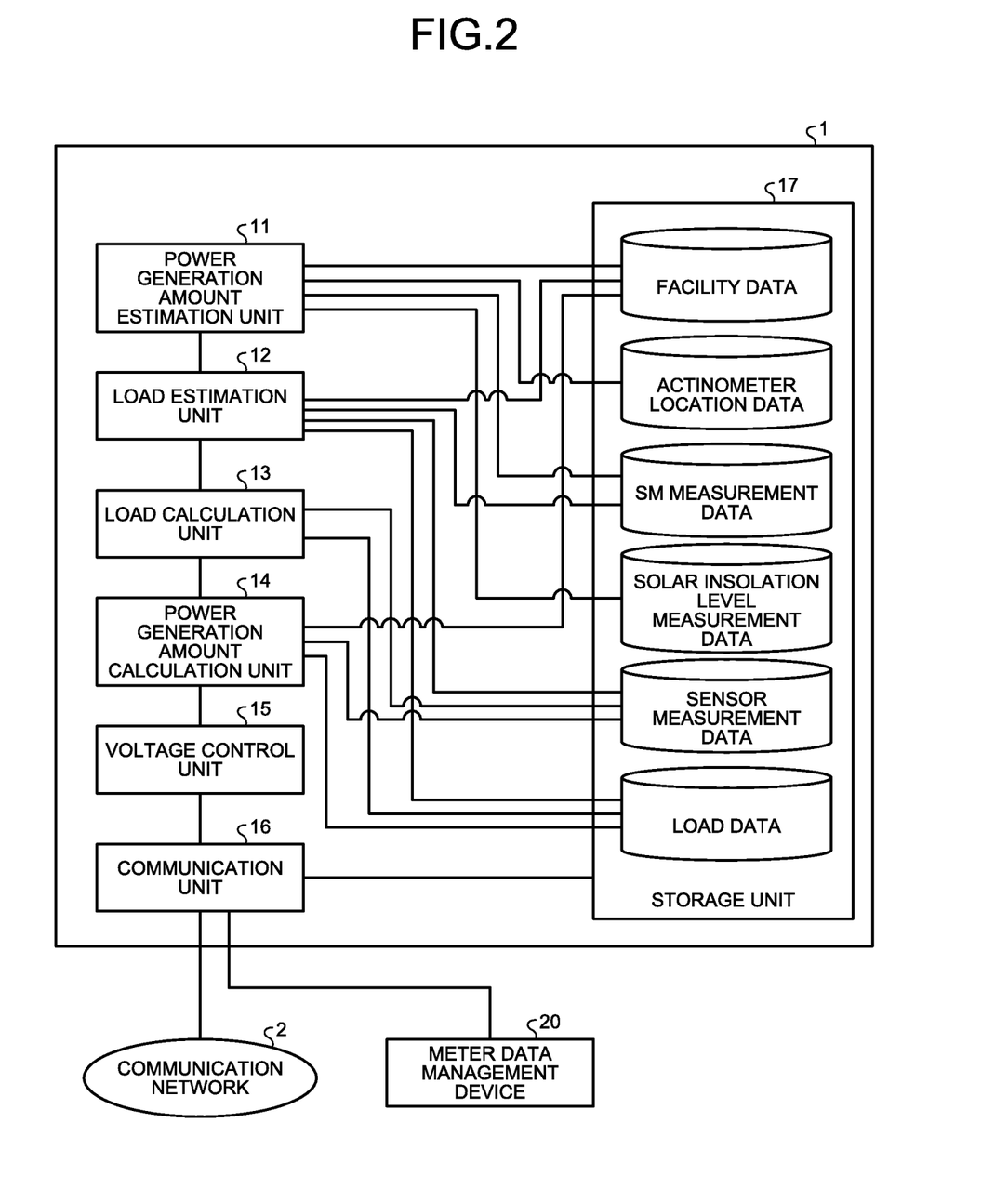
FIG. 2 is a diagram illustrating an example configuration of a power distribution system management device of the embodiment.

FIG. 2 is a diagram illustrating an example configuration of the power distribution system management device 1 of the present embodiment. The power distribution system management device 1 includes a power generation amount estimation unit 11, a load estimation unit 12, a load calculation unit 13, a power generation amount calculation unit 14, a voltage control unit 15, a communication unit 16, and a storage unit 17.

The power generation amount estimation unit 11 estimates a past amount of power generation for each of the solar power generation facilities in the power distribution system, using past measurement values from the whole-power-purchase smart meters and past measurement values of the actinometers, i.e., the measurement devices 53. If no actinometers, i.e., no measurement devices 53, are installed, the past amount of power generation is estimated for each of the solar power generation facilities in the power distribution system using past measurement values from the whole-power-purchase smart meter. The power generation amount estimation unit 11 also estimates the amount of power generation for each section as described later herein based on the past amount of power generation of each of the solar power generation facilities. It is assumed herein that, as described later, the power distribution system management device 1 obtains measurement values from the whole-power-purchase smart meters and measurement values from the measurement devices 53 every day via the communication network 21 and via the meter data management device 20. It is therefore assumed herein that measurement values from the whole-power-purchase smart meters and measurement values from the measurement devices 53 are past values, that is, the values of the day before. However, the power distribution system management device 1 may be configured to be capable of obtaining measurement values from the whole-power-purchase smart meters and measurement values from the measurement devices 53 almost in real time.

The load estimation unit 12 calculates a past amount of total load based on past measurement values from the high-voltage sensors 5-1 to 5-4, on a past amount of power generation, and on past SM measurement data, and stores the calculated past amount of total load in the storage unit 17 as load data. In this operation, the load data may be stored in association with at least one of air temperature, time, and day of the week. Storage of load data in association with at least one of air temperature, time, and day of the week as such enables an amount of load that depends on the air temperature, the time, the day of the week, and/or the like to be estimated when an amount of current or future load is to be estimated using past load data.

The load calculation unit 13 calculates an amount of current load in each section based on the load data. That is, the load calculation unit 13 calculates an amount of load based on past measurement values from the high-voltage sensors 5-1 to 5-4 and on past measurement values from the smart meters. The power generation amount calculation unit 14 calculates the current total amount of power generation based on the amount of load in each section, and on current measurement values of the power flows of the high-voltage sensors 5-1 to 5-4, and then calculates the amount of power generation in each section based on the total amount of power generation. That is, the power generation amount calculation unit 14 calculates the amount of power generation based on the past measurement values from the high-voltage sensors 5-1 to 5-4, and on the past measurement values from the smart meters. The voltage control unit 15 calculates a voltage distribution based on the amount of load calculated by the load calculation unit 13, and on the amount of power generation calculated by the power generation amount calculation unit 14, and thus determines the control level for the voltage controller based on the voltage distribution.

The communication unit 16 receives the measurement values of the high-voltage sensors 5-1 to 5-4 via the communication network 2. The communication unit 16 sends information indicating the voltage control level calculated by the voltage control unit 15 to the voltage control device 80, or to each of the voltage control device 80 and other voltage control device(s). The communication unit 16 stores the received measurement values from the high-voltage sensors 5-1 to 5-4 in the storage unit 17 as sensor measurement data. The communication unit 16 communicates with the meter data management device 20. The communication unit 16 stores, in the storage unit 17, solar insolation amount measurement data and SM measurement data received from the meter data management device 20.

The power distribution system management device 1 of the present embodiment has load contract data and solar power generation facility data stored in the storage unit 17 as facility data. When the measurement device 53 is installed, the storage unit 17 also stores actinometer location data.

Figure 3:
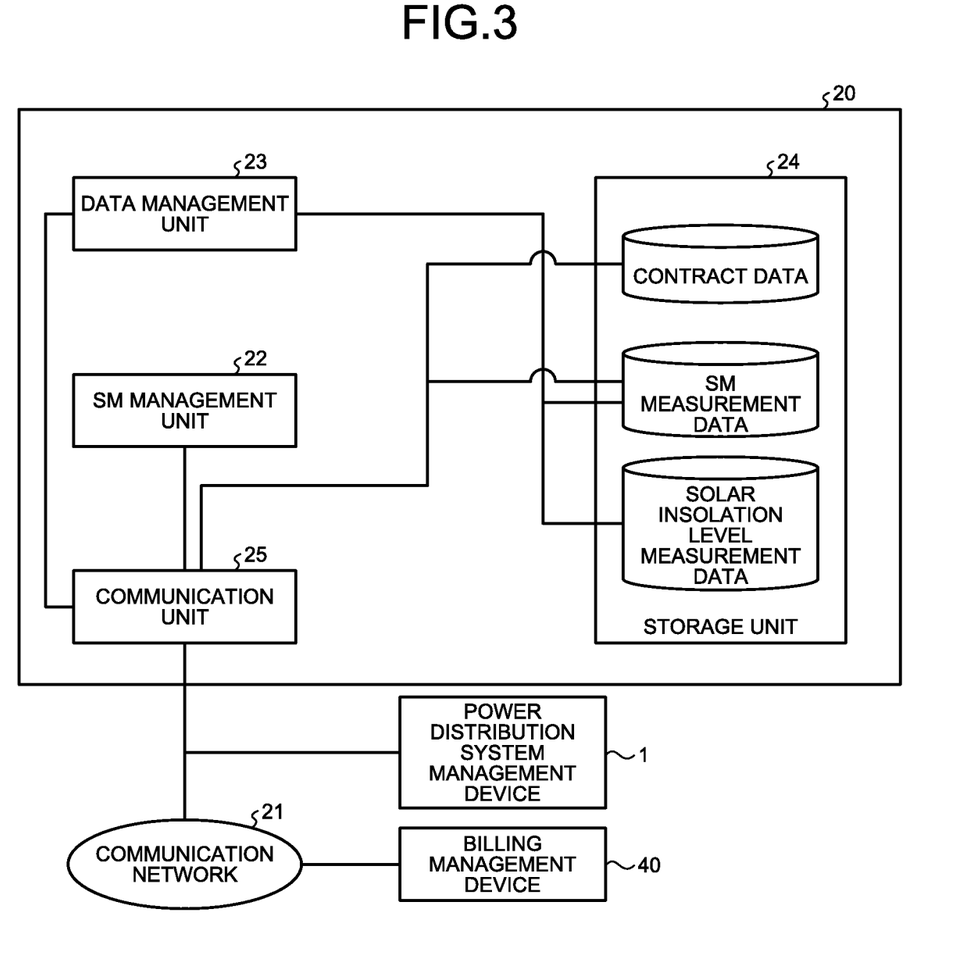
FIG. 3 is a diagram illustrating an example configuration of a meter data management device of the embodiment.

FIG. 3 is a diagram illustrating an example configuration of the meter data management device 20. The meter data management device 20 includes an SM management unit 22, a data management unit 23, a storage unit 24, and a communication unit 25. The communication unit 25 communicates with the smart meters and with the measurement devices 53 via the communication network 21. The communication unit 25 also communicates with the power distribution system management device 1 and a billing management device 40. The billing management device 40 performs processing for purchasing and selling electricity, including generation of a bill that includes an electricity charge charged by an electric utility company to a customer, and generation of a notice of the amount of purchased electricity purchased by an electric utility company from a customer.

The meter data management device 20 is a management device called "meter data management system (MDMS)." The meter data management device 20 receives measurement values of amount of power, that is, pieces of measurement data, i.e., pieces of automatic metering data from the smart meters 31-1, 31-2, 32, and 33, and stores the received pieces of measurement data, i.e., pieces of SM measurement data in the storage unit 24. The meter data management device 20 also stores measurement data received from the measurement device 53, that is, measurement data measured by the actinometer 52, i.e., solar insolation amount measurement data in the storage unit 24. Moreover, the meter data management device 20 controls activation, deactivation, and the like of the smart meters 31-1, 31-2, 32, and 33. The meter data management device 20 may also control activation, deactivation, and the like of the measurement devices 53.

The SM management unit 22 provides control of activation and deactivation of the smart meters, and the like. The SM management unit 22 may also control activation, deactivation, and the like of the measurement devices 53. The data management unit 23 manages the pieces of SM measurement data received from the smart meters. The data management unit 23 sends the pieces of measurement data from the smart meters, i.e., pieces of SM measurement data stored in the storage unit 24 to the billing management device 40 and to the power distribution system management device 1 via the communication unit 25. The data management unit 23 also sends the pieces of measurement data from the measurement devices 53, i.e., pieces of solar insolation amount measurement data stored in the storage unit 24 to the power distribution system management device 1 via the communication unit 25.

Figure 4:
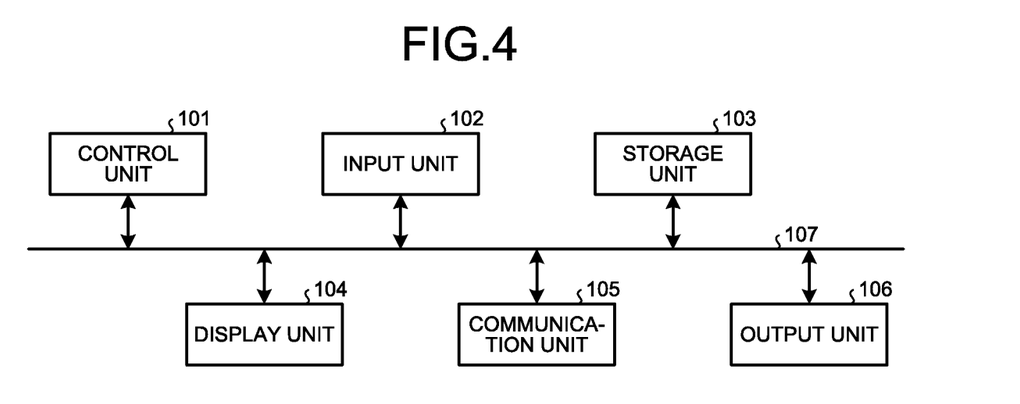
FIG. 4 is a diagram illustrating an example configuration of a computer system of the embodiment.

The power distribution system management device 1 is specifically a computer system, i.e., a computer. A power distribution system management program is executed on this computer system to cause the computer system to function as the power distribution system management device 1. FIG. 4 is a diagram illustrating an example configuration of a computer system of the present embodiment. As illustrated in FIG. 4, this computer system includes a control unit 101, an input unit 102, a storage unit 103, a display unit 104, a communication unit 105, and an output unit 106. These components are connected to one another via a system bus 107.

In FIG. 4, the control unit 101 is, for example, a central processing unit (CPU) or the like, and executes the power distribution system management program of the present embodiment. The input unit 102 includes a keyboard, a mouse, and the like, and is used by a computer system user to input various pieces of information. Examples of the storage unit 103 include various memories such as a random access memory (RAM) and a read-only memory (ROM), and storage devices such as a hard disk drive. The storage unit 103 stores the program to be executed by the control unit 101 described above, necessary data obtained during the processing, and the like. The storage unit 103 is also used as a temporary storage area for the program. The display unit 104 is constituted of a liquid crystal display panel (LCD) and/or the like, and displays various screens for computer system users. The communication unit 105 performs communication processing. Note that the configuration illustrated in FIG. 4 is merely an example, and the configuration of the computer system is not limited to the configuration of the example illustrated in FIG. 4.

An example operation of the computer system to make executable the power distribution system management program of the present embodiment will now be described. In the computer system having the configuration described above, the power distribution system management program is installed into the storage unit 103 from, for example, a CD (compact disc)-ROM or a DVD (digital versatile disc)-ROM loaded in a CD-ROM or DVD-ROM drive. Upon execution of the power distribution system management program, the power distribution system management program read from the storage unit 103 is stored in a predetermined location in the storage unit 103. Under this condition, the control unit 101 performs power distribution system management processing of the present embodiment according to the program stored in the storage unit 103.

Although the present embodiment is described in which the program that describes the power distribution system management processing is provided using a CD-ROM or a DVD-ROM as the recording medium, the scheme for distributing the program is not limited to this, and the program may be provided, for example, through a transmission medium such as the Internet via the communication unit 105 depending on the configuration of the computer system, the size of the program to be provided, and the like.

The power generation amount estimation unit 11, the load estimation unit 12, the load calculation unit 13, the power generation amount calculation unit 14, and the voltage control unit 15 illustrated in FIG. 2 are included in the control unit 101 of FIG. 4. The storage unit 17 of FIG. 2 is a portion of the storage unit 103 of FIG. 4. The communication unit 16 of FIG. 2 corresponds to the communication unit 105 of FIG. 4.

Similarly to the power distribution system management device 1, the meter data management device 20 is also specifically a computer system. When the meter data management device 20 is implemented in the computer system illustrated in FIG. 4, the SM management unit 22 and the data management unit 23 of FIG. 3 are included in the control unit 101 of FIG. 4. The storage unit 24 of FIG. 3 is a portion of the storage unit 103 of FIG. 4. The communication unit 25 of FIG. 3 corresponds to the communication unit 105 of FIG. 4. An example operation of the computer system to make executable the program for providing the meter data management device 20 of the present embodiment, i.e., the meter data management program is similar to the example operation of the computer system to make executable the power distribution system management program.

Figure 5:
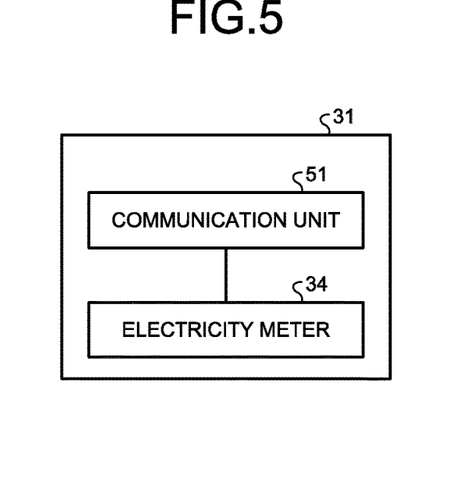
FIG. 5 is a diagram illustrating an example configuration of a smart meter of the embodiment.

FIG. 5 is a diagram illustrating an example configuration of the smart meter 31 of the present embodiment. The smart meter 31 includes the communication unit 51 that performs communication processing for providing connectivity with the communication network 21, and an electricity meter 34 that measures an amount of power.

The smart meters 32 and 33 each have a configuration similar to the configuration of the smart meter 31. However, the electricity meter 34 of the smart meter 32 measures the amount of upstream power, i.e., power flowing in the direction from the customer to the electric utility company. The electricity meter 34 of the smart meter 33 measures the amount of power calculated by subtraction of the amount of downstream power from the amount of upstream power.

The operation of the present embodiment will next be described. The power distribution system management device 1 of the present embodiment corrects the measurement value of a high-voltage sensor by the measurement value of a smart meter to estimate the state of each of the power distribution lines 9-1 and 9-2 of the power distribution system.

Specifically, the power distribution system management device 1 calculates a past amount of power generation and a past amount of load at fixed intervals, e.g., on a per-day basis using past measurement values of the high-voltage sensors 5-1 to 5-4 and of the smart meters and solar power generation facility data, and stores the amount of load as load data. As described above, the measurement device 53 may not be installed, but when the measurement device 53 is installed, the past measurement values described above denote measurement values from the high-voltage sensors 5-1 to 5-4, the smart meters, and the measurement device(s) 53. Next, the power distribution system management device 1 estimates the current states of the power distribution lines 9-1 and 9-2 using the load data and current, i.e., latest measurement values every centralized control period to control the voltage controllers connected to the power distribution lines 9-1 and 9-2 depending on the states estimated. The centralized control period is, for example, 30 minutes, but the centralized control period is not limited to this value. The power distribution system management device 1 may perform only the estimation of current states, i.e., state estimation of the power distribution lines 9-1 and 9-2 with a period shorter than the centralized control period, such as 5 minutes or 1 minute.

Figure 6:
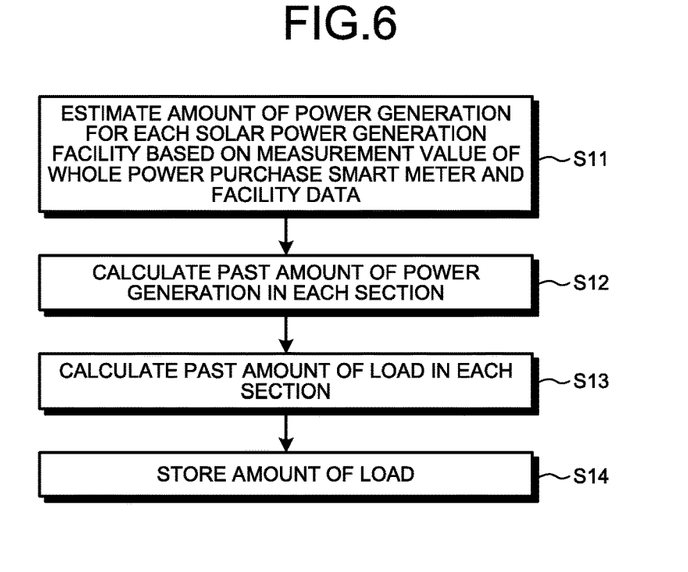
FIG. 6 is a flowchart illustrating an example of procedure for calculating a past amount of power generation and a past amount of load in the power distribution system management device.

Calculation of a past amount of power generation and a past amount of load will first be described. FIG. 6 is a flowchart illustrating an example of procedure for calculating a past amount of power generation and a past amount of load in the power distribution system management device 1. In the power distribution system management device 1, the power generation amount estimation unit 11 estimates the past amount of power generation for each of the solar power generation facilities using past measurement values of the associated whole-power-purchase smart meter and using solar power generation facility data (step S11). As described above, when the measurement device 53 is installed, the power generation amount estimation unit 11 estimates the past amount of power generation for each of the solar power generation facilities using past measurement values of the associated whole-power-purchase smart meter and of the measurement device 53 and using solar power generation facility data.

A whole-power-purchase smart meter is installed for automatic metering. Use of measurement values of a whole-power-purchase smart meter enables the power distribution system management device 1 to directly know the amount of power generation of the associated solar power generation facility. On the other hand, a solar power generation facility that does not support a whole-power-purchase smart meter has no way to know the amount of power generation from measurement values of a smart meter. Considering that the amount of power generation of a solar power generation facility depends on the solar insolation amount, which in turn depends on weather conditions, the amount of power generation of a solar power generation facility that does not support a whole-power-purchase smart meter may be estimated using measurement values of a whole-power-purchase smart meter that is located at a geographically close location.

Figure 7:
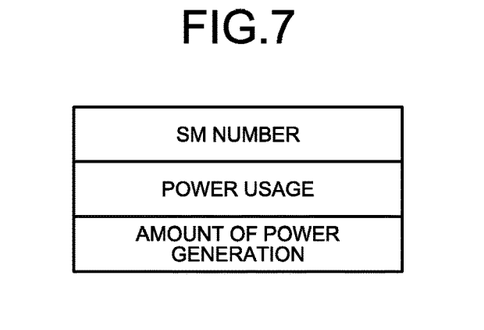
FIG. 7 is a diagram illustrating an example structure of measurement data sent by a smart meter.

FIG. 7 is a diagram illustrating an example structure of measurement data sent by the smart meters 31-1, 31-2, 32, and 33. The measurement data sent by the smart meters 31-1, 31-2, 32, and 33 contains, as illustrated in FIG. 7, an SM number, which represents a number for identification of a smart meter, and a power usage and an amount of power generation, which are measurement results. The power usage and the amount of power generation are generally accumulated values, and are updated every 30 minutes. That is, the amount of power used in the last 30 minutes is sequentially added to the power usage, and the amount of power generation in the last 30 minutes is sequentially added to the amount of power generation.

Note that a smart meter connected only to a load or only to a solar power generation facility does not necessarily need to send measurement data containing an amount of power generation or a power usage. However, to use a uniform format, it is assumed herein that all the smart meters send measurement data as illustrated in FIG. 7. The format of the measurement data is not limited to the format illustrated in FIG. 7, and different formats may thus be used depending on what the smart meters measure. The measurement data may also include information other than the information illustrated in FIG. 7.

Alternatively, there may be no whole-power-purchase smart meters installed near the solar power generation facility. Therefore, installation of the measurement devices 53 for measuring the solar insolation amount will enable the amount of power generation generated by the solar power generation facility to be estimated with higher accuracy. The measurement devices 53 are arranged in an arrangement as geographically uniform as possible, and the measurement values from the measurement devices 53 are collected via the communication network 21 included in a smart meter network. As used herein, the term "smart meter network" refers to a network used for collection of measurement values from smart meters that measure an amount of power. A smart meter network includes the communication network 21 and the meter data management device 20. This configuration eliminates the need to provide an additional network for actinometers, thereby enabling the total amount of power generation over the power distribution line to be obtained without increasing the cost.

Although a smart meter is assigned an SM number, which represents a number for identification of a smart meter, the present embodiment assumes that the measurement devices 53 are also assigned SM numbers similarly to the smart meters. Although it is assumed here that the smart meters and the measurement devices 53 are both assigned SM numbers, the smart meters and the measurement devices 53 may be assigned numbers in different numbering systems. The measurement data sent by a measurement device 53 has a format, for example, similar to the format illustrated in FIG. 7, but the solar insolation amount is used in place of the power usage and the amount of power generation.

Upon reception of measurement values from the smart meters and from the measurement devices 53, the meter data management device 20 accumulates the received pieces of measurement data for 24 hours. Specifically, the communication unit 25 receives measurement values from the smart meters and from the measurement devices 53 via the communication network 21. The communication unit 25 then determines whether the received data is sent from a smart meter or from a measurement device 53 based on the SM measurement data stored in the storage unit 24. The communication unit 25 stores measurement data received from a smart meter in the storage unit 24 as SM measurement data, and stores measurement data received from a measurement device 53 in the storage unit 24 as solar insolation amount measurement data. The data management unit 23 sends pieces of SM measurement data and pieces of solar insolation amount measurement data for one day to the power distribution system management device 1 via the communication unit 25.

Although the meter data management device 20 is herein described as accumulating data for 24 hours, and then sending the data accumulated, the accumulation period is not limited to 24 hours. Alternatively, the meter data management device 20 may send the received data directly to the power distribution system management device 1. Although the power distribution system management device 1 is herein described as receiving SM measurement data and solar insolation amount measurement data from the meter data management device 20 via a communication line, the power distribution system management device 1 may obtain the SM measurement data and the solar insolation amount measurement data via a medium other than a communication line. That is, the communication unit 16 is one configuration of an acquisition unit that acquires SM measurement data and solar insolation amount measurement data, and the acquisition unit may be an input unit for reading a medium, or the like.

Figure 8:
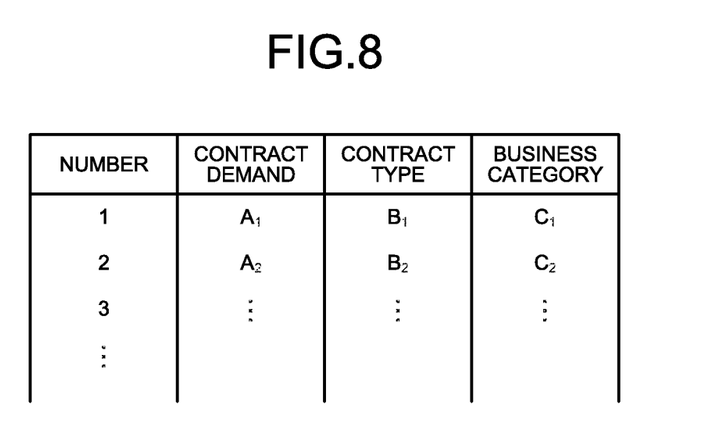
FIG. 8 is a diagram illustrating an example structure of load contract data.

FIG. 8 is a diagram illustrating an example structure of load contract data. In the example illustrated in FIG. 8, the load contract data contains sets of a number that serves as an identification number of each load, e.g., each customer, a contract demand, a contract type, and a business category. The contract type is the type of contract, including, for example, standard service, mid-night power service, and time-specific power service. The load contract data may not contain a contract type or a business category. If estimation is made in consideration of the contract type and of the business category to calculate time-specific load data in estimation of the amount of load as described later, the contract type and the business category are included in the load contract data.

Figure 9:
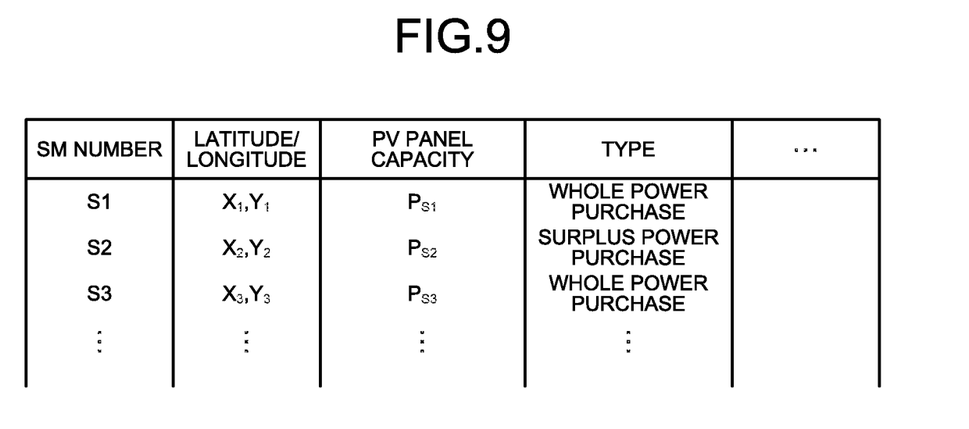
FIG. 9 is a diagram illustrating an example structure of solar power generation facility data.

FIG. 9 is a diagram illustrating an example structure of the solar power generation facility data. As illustrated in FIG. 9, the solar power generation facility data of the present embodiment contains: an SM number, which represents the SM number of the smart meter to which that solar power generation facility is connected; the latitude and longitude of the location where the solar power generation facility is installed; a photovoltaics (PV) panel capacity, which represents the capacity of the solar panel (PV panel) of the solar power generation facility; and the type that indicates whether the contract is based on whole power purchase or surplus power purchase.

The actinometer location data contains an SM number, which represents the SM number of the measurement device 53, and the installation location of the actinometer 52 of the measurement device 53, i.e., the latitude and longitude of the location where the measurement device 53 is located. The location of the actinometer 52 of a measurement device 53 is hereinafter referred to as "the location of the measurement device 53." In addition, a solar power generation facility connected with a whole-power-purchase smart meter, and a measurement device 53, are also herein referred to as "measurement value-known device."

The power generation amount estimation unit 11 references the solar power generation facility data to estimate the amount of power generation of a solar power generation facility not connected with a whole-power-purchase smart meter on the basis of, for example, measurement values of three nearest measurement-value-known devices from that solar power generation facility. The three nearest measurement-value-known devices from a solar power generation facility are solar power generation facilities each connected with a whole-power-purchase smart meter when no measurement devices 53 are installed. Each of the three nearest measurement-value-known devices is a solar power generation facility connected with a whole-power-purchase smart meter or is a measurement device 53 when one or more measurement devices 53 are installed.

A description will be given below using an example in which one or more measurement devices 53 are installed. It is assumed here that, for example, the three nearest measurement-value-known devices from the solar power generation facility 4-1 are the solar power generation facility 4-2 and the measurement devices 53-1 and 53-2. In this configuration, the power generation amount estimation unit 11 extracts, from the SM measurement data, a measurement value $M_{4-1}$ for the amount of power generation associated with an SM number corresponding to the solar power generation facility 4-1, and extracts, from the solar power generation facility data, PV panel capacities $P_{4-1}$ and $P_{4-2}$ associated with SM numbers respectively corresponding to the solar power generation facility 4-1 and the solar power generation facility 4-2. The power generation amount estimation unit 11 also extracts, from the solar insolation amount measurement data, measurement values $L_{53-2}$ and $L_{52-1}$ respectively corresponding to the SM numbers of the measurement device 53-2 and of the measurement device 53-1. The power generation amount estimation unit 11 calculates an estimation value $E_{4-2}$ of the amount of power generation of the solar power generation facility 4-2 using Equation (1) below. The constant α is a factor for converting the solar insolation amount into a ratio of the amount of power generation relative to the panel capacity of that solar power generation facility (the ratio hereinafter also referred to as "power generation efficiency"). The constant α has a predetermined value. The value of α may vary seasonally. Although the value of α is here assumed to be constant for all actinometers, the value of α may differ for each actinometer. Note that the measurement value of an actinometer is herein assumed to be a solar insolation amount per unit area.

$$E_{4-2}=(M_{4-1} \times P_{4-2}/P_{4-1}+\alpha \times P_{4-2} \times (L_{53-2}+L_{53-1}))/3 \quad (1)$$

The processing is performed, in general terms, as follows. When the three selected measurement-value-known devices include a solar power generation facility not connected with a whole-power-purchase smart meter, the power generation amount estimation unit 11 calculates the power generation efficiency from the measurement value of the amount of power generation of that solar power generation facility. The power generation amount estimation unit 11 then multiplies together the power generation efficiency calculated and the PV panel capacity of the solar power generation facility in estimation to calculate the individual estimation value. Alternatively, when a measurement device 53 is included in the three selected measurement-value-known devices, the power generation amount estimation unit 11 multiplies together the factor to convert the solar insolation amount into the power generation efficiency, the PV panel capacity of the solar power generation facility in estimation, and the measurement value from the measurement device 53 to calculate the individual estimation value. The power generation amount estimation unit 11 then calculates the average of the individual estimation values for the three measurement-value-known devices as the estimated amount of power generation. The power generation amount estimation unit 11 calculates the estimated amount of power generation as described above for all the solar power generation facilities that are not connected with a whole-power-purchase smart meter. The power generation amount estimation unit 11 calculates the amount of power generation described above for each time zone, e.g., for each of 30-minute periods.

Returning back to FIG. 6, the power generation amount estimation unit 11 calculates, for each of predetermined sections, the past amount of power generation generated by the solar power generation facility or facilities in that section, that is, the total amount of power generation in each section (step S12). These sections are multiple sections defined by sectioning the power distribution line between two high-voltage sensors among multiple high-voltage sensors. For example, these sections may be defined on a per pole-mounted transformer basis, that is, may each be the portion between a pole-mounted transformer and a pole-mounted transformer adjacent to that pole-mounted transformer. Although these sections are hereinafter described as being defined on a per pole-mounted transformer basis, these sections are not limited to the sections being defined on a per pole-mounted transformer basis, and it suffices that a power distribution line between two high-voltage sensors that each measure the voltage and the power flow of that power distribution line be sectioned into multiple sections. The example described below only considers the amount of power generation generated by a solar power generation facility as the amount of power generation. However, when a power generation facility other than a solar power generation facility is connected to the power distribution line, the total amount of power generation in each section may also include the amount of power generation of such power generation facility. In such case, the amount of power generation generated by the power generation facility other than a solar power generation facility is assumed to be a known value, and the power generation amount estimation unit 11 thus adds an amount of the power generation predetermined for each section. This predetermined amount of power generation may vary depending on the time zone, and thus be preset as such.

Next, the load estimation unit 12 calculates the past amount of load in each section based on the measurement values from the high-voltage sensors 5-1 to 5-4, the amount of power generation in each section calculated at step S12, and the load contract data (step S13). Specifically, the load estimation unit 12 first calculates the past amount of load in each section based on the past SM measurement data. In more detail, for each of the loads specified in the load contract data, the load estimation unit 12 uses the power usage measured by a smart meter for a load whose power usage measured by that smart meter is contained in the SM measurement data, and uses the contract demand for a load whose power usage is not contained in the SM measurement data, to calculate the total amount of corresponding load(s) in each section in each time zone.

Next, the load estimation unit 12 divides, over the sections, the difference between an active power Pa measured by the high-voltage sensor at the feed end point and an active power Pb measured by the high-voltage sensor at the terminal end of each of the power distribution lines, using the amount of power generation and the amount of load calculated for each section. Similarly, the load estimation unit 12 divides, over the sections, the difference between a reactive power Qa measured by the high-voltage sensor at the feed end point and a reactive power Qb measured by the high-voltage sensor at the terminal end of each of the power distribution lines, using the amount of load calculated for each section. If a capacitor is connected on the power distribution lines 9-1 and 9-2, the reactive power due to the capacitor is previously obtained. For example, because the active power caused by a capacitor remains constant regardless of day or night, the amount of power generation is measured at night when no power is generated by sunlight to obtain a reactive power Qc of the capacitor using a power factor of 1.

Figure 10:
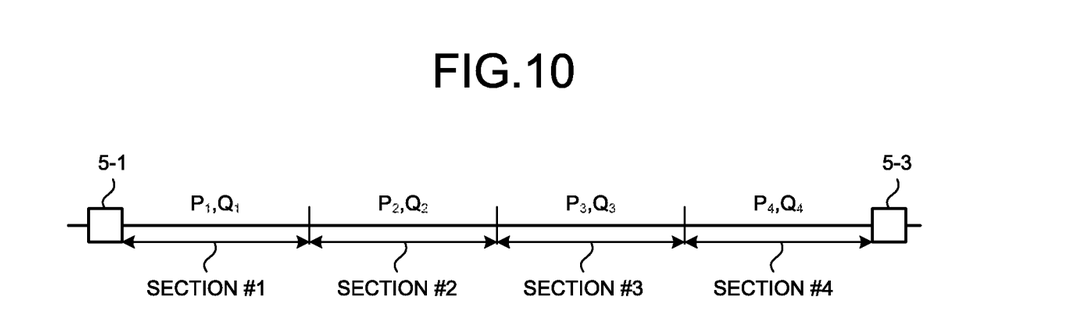
FIG. 10 is a diagram illustrating active power and reactive power assigned to each section on a power distribution line.

The power distribution line 9-1 will be described below as an example. FIG. 10 is a diagram illustrating active power and reactive power assigned to each section on the power distribution line 9-1. In FIG. 10, the power distribution line 9-1 is sectioned into four sections. The active power assigned to the i-th (where i=1, 2, 3, and 4) section is denoted as $P_i$, and the reactive power assigned to the i-th section is denoted as $Q_i$. Let $PG_i$ denote the electric power corresponding to the amount of power generation calculated for each section, and $PL_i$ denote the electric power corresponding to the amount of load calculated for each section. Then, the load estimation unit 12 divides, over the sections, the difference between the active power Pa measured by the high-voltage sensor at the feed end point and the active power Pb measured by the high-voltage sensor at the terminal end using Equation (2) below. The symbol $\Sigma$ in Equation (2) below indicates the sum over a range of the parameter i from i=1 to i=4.

$$P_i = ((PG_i - PL_i)/\Sigma(PG_i - PL_i)) \times (Pb - Pa) \quad (2)$$

The reactive power is processed such that the remainder after subtraction of Qc from Qb−Qa is divided over the sections. For example, the load estimation unit 12 divides the reactive power over the sections using Equation (3) below. In this process, using predetermined values for parameters $\beta = QL_i/PL_i$ and $\gamma = QG_i/PG_i$, the load estimation unit 12 calculates the values of $QG_i$ and $QL_i$ from the values of $PG_i$ and $PL_i$. For example, the values are predetermined such that $\beta = \gamma = 0.1$.

$$Q_i = ((QG_i - QL_i)/\Sigma(QG_i - QL_i)) \times (Qb - Qa - Qc) \quad (3)$$

The load estimation unit 12 uses the power values $P_i$ and $Q_i$ assigned by dividing as described above and a voltage Va measured by the high-voltage sensor at the feed end point of the power distribution line to calculate the voltage in each section using power flow calculation. The voltage at the terminal end calculated by this power flow calculation is denoted by Vd. When the difference between the voltage Vd and the voltage Vb measured by the high-voltage sensor at the terminal end of the power distribution line is within a predetermined threshold, that is, when the measured voltage Vb and the calculated voltage are consistent with each other, the load estimation unit 12 allows the process to proceed to step S14 illustrated in FIG. 6. That is, the estimated voltage distribution and the voltages measured by the two high-voltage sensors coincide with each other, the process proceeds to step S14.

Figure 11:
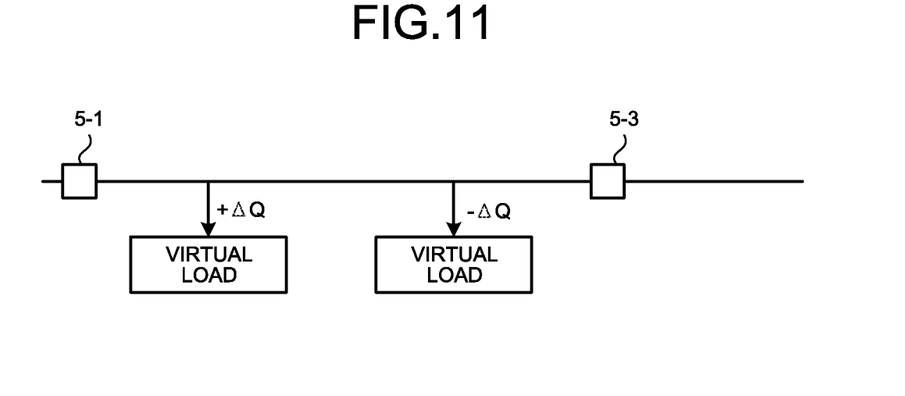
FIG. 11 is a diagram illustrating an example arrangement of virtual loads.

Otherwise, when the difference between the voltage Vd and the voltage Vb measured by the high-voltage sensor at the terminal end of the power distribution line is greater than the predetermined threshold, the load estimation unit 12, for example, places virtual loads that will generate reactive power having an amount of same absolute value and opposite in polarity such that each of the virtual loads is arranged at corresponding one of both ends between the measurement points. FIG. 11 is a diagram illustrating an example arrangement of the virtual loads. As illustrated in FIG. 11, a virtual load that will generate reactive power +ΔQ is added at an upstream end, and a virtual load that will generate reactive power −ΔQ is added at a downstream end, between the measurement points, i.e., between the high-voltage sensor 5-1 and the high-voltage sensor 5-3. After placement of these virtual loads, the load estimation unit 12 performs again the power flow calculation. When this power flow calculation results in a match between the voltage Vd and the voltage Vb, the load estimation unit 12 allows the process to proceed to step S14 illustrated in FIG. 6. When the difference between the voltage Vd and the voltage Vb measured by the high-voltage sensor at the terminal end of the power distribution line does not fall within the predetermined threshold, then the value of ΔQ is changed and the power flow calculation is repeated.

Returning back to FIG. 6, after step S13, the load estimation unit 12 stores the amount of load calculated for each time zone in the storage unit 17 as load data (step S14). In this process, the amounts for the virtual loads are also included in the load data when virtual loads are added.

Figure 12:
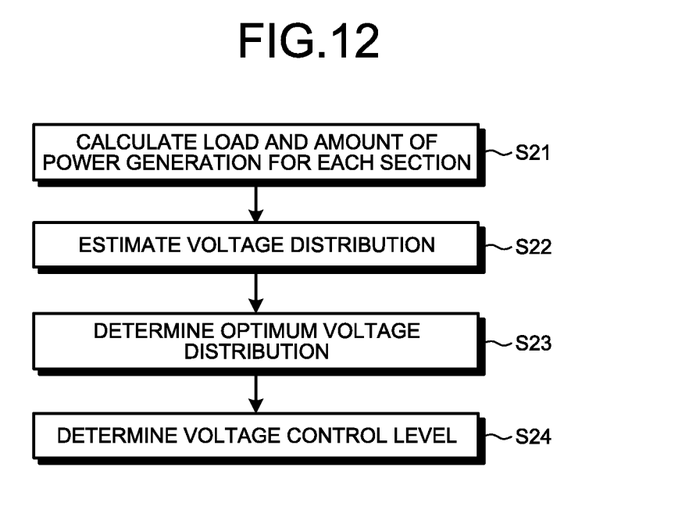
FIG. 12 is a flowchart illustrating an example procedure of state estimation and voltage control of the embodiment.

The current state estimation method and voltage control of the present embodiment will next be described. FIG. 12 is a flowchart illustrating an example procedure of state estimation and voltage control of the present embodiment. The load calculation unit 13 and the power generation amount calculation unit 14 calculate the load and the amount of power generation for each section based on the latest sensor measurement values, i.e., measurement values of the high-voltage sensors and the load data (step S21). Specifically, the load calculation unit 13 first calculates the current amount of load in each section based on the load data. In more detail, the load calculation unit 13 extracts, from the load data, the amounts of total load for a latest fixed time period among the amounts of load in the same time zone as the current time, calculates the average of the extracted amounts of total load, and determines that the average calculated is the current amount of load.

Alternatively, the load calculation unit 13 may previously calculate an average for each air temperature range for each time zone based on the load data for the past one year, and determine that the average value corresponding to the current air temperature and the current time zone is the current amount of total load. The air temperature is divided into ranges in, for example, 5-degree steps, such as ... , 0° C. to 5° C., 5° C. to 10° C., etc. The average value of the total load for the past one year is previously calculated for each air temperature range for each time zone.

Further alternatively, the load calculation unit 13 may define weekday and holiday as the day-of-the-week categories, and use average values based on the day-of-the-week category. As used herein, the term "weekday" refers to Monday to Friday except legal holidays, and the term "holiday" refers to Saturday, Sunday, and legal holidays. The load calculation unit 13 calculates the average amount of load for each time zone for each of the day-of-the-week categories. The load calculation unit 13 then determines that the average value corresponding to the current day-of-the-week category is the current amount of load.

The power generation amount calculation unit 14 then calculates the current total amount of power generation based on the current amount of load in each section calculated at step S21 and on the current measurement value of the power flow by the high-voltage sensor. The power generation amount calculation unit 14 calculates the amount of power generation in each section based on the current total amount of power generation. For calculation of the amount of power generation in each section, for example, the ratio for dividing the total amount of power generation is previously determined for each section based on the PV panel total area in each section using the solar power generation facility data. When a measurement value by the measurement device 53 can be obtained in quasi-real time, e.g., on a per-minute basis, the power generation amount calculation unit 14 may calculate the amount of power generation using the measurement value by the measurement device 53, i.e., by the solar insolation diameter 52. That is, the power generation amount calculation unit 14 may estimate the amount of power generation generated by each solar power generation facility using the measurement value of the measurement device 53, and calculate the amount of power generation in each section based on the estimated amount of power generation. The power generation amount calculation unit 14 may estimate the amount of power generation generated by each solar power generation facility using the measurement value of the measurement device 53 similarly to, for example, how the power generation amount estimation unit 11 estimates an amount of power generation.

Next, the voltage control unit 15 performs power flow calculation based on the current amount of load and on the current amount of power generation in each section to estimate the voltage distribution (step S22). The voltage control unit 15 then determines an optimum voltage distribution using the current amount of load and the current amount of power generation in each section and using the voltage distribution (step S23). The optimum voltage distribution may be calculated in any manner. For example, the voltage control unit 15 performs power flow calculation based on the current amount of load and on the current amount of power generation in each section to calculate an optimum solution for the voltage at each point so that the voltage falls within a suitable voltage range at each point on the power distribution line 9-1. The term "optimum solution" herein refers to a solution that minimizes a predetermined evaluation function. Examples of the evaluation function may include the difference between the suitable voltage range at each point on the power distribution line 9-1 and the voltage.

The voltage control unit 15 determines the voltage control level based on the optimum voltage distribution (step S24). The voltage control unit 15 may control, as the voltage control level, an optimum control level for maintaining the voltage calculated as the optimum voltage distribution, or may specify, as the voltage control level, information indicating upper and lower limits that define the voltage control range determined based on the optimum control level. The term "optimum control level" refers to a control level on which a voltage controller is instructed to provide the optimum voltage distribution. The voltage control unit 15 sends the voltage control level determined, to the voltage control device 80 via the communication unit 16. When there is another voltage control device controlled by the power distribution system management device 1 in addition to the voltage control device 80, the voltage control unit 15 further determines a control level for that voltage control device, and then sends the voltage control level determined, to that voltage control device via the communication unit 16. The voltage control unit 15 repeats the operation described above every centralized control period. Note that, as described above, the process up to the voltage distribution estimation step, i.e., state estimation step, that is, the process of steps S21 and S22 may be performed with a shorter period than the centralized control period.

As described above, the voltage control unit 15 has a function as a state estimation unit that sections the power distribution line between two high-voltage sensors among multiple high-voltage sensors into multiple sections to estimate a voltage distribution along the power distribution line based on two measurement values received from the two high-voltage sensors, and on the amount of power measured by the smart meter(s) in each of the sections; and a function as a centralized voltage control unit that controls the voltage controller based on the voltage distribution. The voltage control unit 15 may be configured to be divided into a state estimation unit and a centralized voltage control unit.

The example illustrated in FIG. 1 has been described in which two high-voltage sensors are installed at the feed end point and at the terminal end. However, the high-voltage sensors may be installed not only at the feed end point and at the terminal end, but also between the feed end point and the terminal end. Also in this case, deeming measurement values by two adjacent high-voltage sensors corresponding to the power distribution line as measurement values at the feed end point and at the terminal end described above enables the state of the power distribution system to be estimated similarly by sectioning the section between the measurement points of the two high-voltage sensors into multiple sections.

As described above, the power distribution system management device 1 of the present embodiment calculates the voltage in each section of the power distribution line using measurement values of two high-voltage sensors on the power distribution line in a high-voltage system and using a measurement value of a smart meter. When the measurement values of the high-voltage sensors and the calculated voltage are inconsistent with each other, virtual loads of a same absolute value and opposite in polarity are placed such that each of the virtual loads is placed at corresponding one of both ends between the high-voltage sensors to make correction. Thus, the state of a power distribution system can be estimated with high accuracy.

The configurations described in the foregoing embodiment are merely examples of various aspects of the present invention. These configurations may be combined with a known other technology, and moreover, a part of such configurations may be omitted and/or modified without departing from the spirit of the present invention.

REFERENCE SIGNS LIST 1 power distribution system management device; 2, 21 communication network; 3-1 to 3-3 load; 4-1, 4-2 solar power generation facility; 5-1 to 5-4 high-voltage sensor; 6-1, 6-2 circuit breaker; 7 voltage controller; 8 busbar; 9-1, 9-2 power distribution line; 11 power generation amount estimation unit; 12 load estimation unit; 13 load calculation unit; 14 power generation amount calculation unit; 15 voltage control unit; 16, 25, 105 communication unit; 17, 24, 103 storage unit; 20 meter data management device; 22 SM management unit; 23 data management unit; 30-1 to 30-3 customer; 31-1, 31-2, 32, 33 smart meter; 34 electricity meter; 51 communication unit; 52 actinometer; 53-1 to 53-2 measurement device; 80 voltage control device; 101 control unit; 102 input unit; 104 display unit; 106 output unit; 107 system bus.

The invention claimed is:

1. A power distribution system state estimation device comprising:
  a processor to execute a program; and
  a memory to store the program which, when executed by the processor, performs processes of,
  receiving measurement values from a plurality of high-voltage sensors that each measure a voltage and a power flow of a power distribution line in a high-voltage system, and receiving, from a plurality of smart meters that each measure an amount of power, information on the amount of power, wherein each of the plurality of smart meters is respectively configured to measure an amount of downstream power flowing from the power distribution line toward a respective load and/or to measure an amount of upstream power flowing from a respective power generation device toward the power distribution line; and for each of a plurality of sections of the power distribution line between two adjacent high-voltage sensors among the plurality of high-voltage sensors, calculating an amount of load of each of the sections based on two of the measurement values received from the two adjacent high-voltage sensors and on the amount of power of each of the sections that is measured by one or more smart meters connected to a respective section of the power distribution line, and estimating a voltage distribution along the power distribution line based on the amount of load of each of the sections, wherein, when the voltage distribution estimated and the voltages measured by the two adjacent high-voltage sensors are inconsistent with each other, the processor calculates the voltage distribution using a load model including two virtual loads that generate reactive power having a same absolute value and opposite in polarity each of which is arranged at a corresponding one of both ends inward of the two adjacent high-voltage sensors between the two adjacent high-voltage sensors.

2. The power distribution system state estimation device according to claim 1, wherein the processor further controls a voltage controller that controls a voltage of the power distribution line, based on the voltage distribution.

3. The power distribution system state estimation device according to claim 1, wherein the processor further calculates an amount of load based on past measurement values from the high-voltage sensors and on past measurement values of the smart meters, and calculates an amount of power generation based on the amount of load and on measurement values of the high-voltage sensors, wherein the processor estimates the voltage distribution based on the amount of power generation and on the amount of load.

4. The power distribution system state estimation device according to claim 3, wherein the processor calculates the amount of power generation further based on a solar insolation amount being a measurement value measured by an actinometer.

5. The power distribution system state estimation device according to claim 1, wherein the amount of power is a power usage.

6. The power distribution system state estimation device according to claim 1, wherein at least one respective power generation device comprises a solar power generation device.

7. A power distribution system state estimation method for a power distribution system state estimation device, the method comprising:

by a processor of the power distribution system state estimation device, receiving measurement values from a plurality of high-voltage sensors that each measure a voltage and a power flow of a power distribution line in a high-voltage system, and receiving, from a plurality of smart meters that each measure an amount of power, information on the amount of power, wherein each of the plurality of smart meters is respectively configured to measure an amount of downstream power flowing from the power distribution line toward a respective load and/or to measure an amount of upstream power flowing from a respective power generation device toward the power distribution line; and for each of a plurality of sections of the power distribution line between two adjacent high-voltage sensors among the plurality of high-voltage sensors, calculating, by the processor of the power distribution system state estimation device, an amount of load of each of the sections based on two of the measurement values received from the two adjacent high-voltage sensors and on the amount of power of each of the sections that is measured by one or more smart meters connected to a respective section of the power distribution line, and estimating, by the processor of the power distribution system state estimation device, a voltage distribution along the power distribution line based on the amount of load of each of the sections, wherein, when the voltage distribution estimated and the voltages measured by the two adjacent high-voltage sensors are inconsistent with each other, calculating, by the processor of the power distribution system state estimation device, the voltage distribution using a load model including two virtual loads that generate reactive power having a same absolute value and opposite in polarity each of which is arranged at a corresponding one of both ends inward of the two adjacent high-voltage sensors between the two adjacent high-voltage sensors.

8. The power distribution system state estimation method according to claim 7, wherein at least one respective power generation device comprises a solar power generation device.

9. A power distribution system state estimation device comprising:

a processor to execute a program; and a memory to store the program which, when executed by the processor, performs processes of, receiving measurement values from a plurality of high-voltage sensors that each measure a voltage and a power flow of a power distribution line in a high-voltage system, and receiving, from a plurality of smart meters that each measure an amount of power, information on the amount of power, wherein each of the plurality of smart meters is respectively configured to measure an amount of downstream power flowing from the power distribution line toward a respective load and/or to measure an amount of upstream power flowing from a respective power generation device toward the power distribution line; and for each of a plurality of sections of the power distribution line between two adjacent high-voltage sensors among the plurality of high-voltage sensors, calculating an amount of load of each of the sections based on two of the measurement values received from the two adjacent high-voltage sensors and on the amount of power of each of the sections that is measured by one or more smart meters connected to a respective section of the power distribution line, and estimating a voltage distribution along the power distribution line based on the amount of load of each of the sections;

wherein the processor further calculates an amount of load based on past measurement values from the high voltage sensors and on past measurement values of the smart meters, and calculates an amount of power generation based on the amount of load and on measurement values of the high-voltage sensors, wherein the processor estimates the voltage distribution based on the amount of power generation and on the amount of load.

10. The power distribution system state estimation device according to claim 9, wherein the processor further controls a voltage controller that controls a voltage of the power distribution line, based on the voltage distribution.

11. The power distribution system state estimation device according to claim 9, wherein the processor calculates the amount of power generation further based on a solar insolation amount being a measurement value measured by an actinometer.

12. The power distribution system state estimation device according to claim 9, wherein the amount of power is a power usage.

13. The power distribution system state estimation device according to claim 9, wherein at least one respective power generation device comprises a solar power generation device.

14. A power distribution system state estimation method for a power distribution system state estimation device, the method comprising:

by a processor of the power distribution system state estimation device, receiving measurement values from a plurality of high-voltage sensors that each measure a voltage and a power flow of a power distribution line in a high-voltage system, and receiving, from a plurality of smart meters that each measure an amount of power, information on the amount of power, wherein each of the plurality of smart meters is respectively configured to measure an amount of downstream power flowing from the power distribution line toward a respective load and/or to measure an amount of upstream power flowing from a respective power generation device toward the power distribution line; and for each of a plurality of sections of the power distribution line between two adjacent high-voltage sensors among the plurality of high-voltage sensors, calculating, by the processor of the power distribution system state estimation device, an amount of load of each of the sections based on two of the measurement values received from the two adjacent high-voltage sensors and on the amount of power of each of the sections that is measured by one or more smart meters connected to a respective section of the power distribution line, and estimating, by the processor of the power distribution system state estimation device, a voltage distribution along the power distribution line based on the amount of load of each of the sections, wherein the method further comprises calculating, by the processor, an amount of load based on past measurement values from the high-voltage sensors and on past measurement values of the smart meters, and calculating, by the processor, an amount of power generation based on the amount of load and on measurement values of the high-voltage sensors, wherein the processor estimates the voltage distribution based on the amount of power generation and on the amount of load.

15. The power distribution system state estimation method according to claim 14, wherein at least one respective power generation device comprises a solar power generation device.

* * * * *